United States Patent
Peterson et al.

(10) Patent No.: US 8,539,276 B2
(45) Date of Patent: Sep. 17, 2013

(54) RECOVERING FROM LOST RESOURCES IN A DISTRIBUTED SERVER ENVIRONMENT

(75) Inventors: Nathan J. Peterson, Raleigh, NC (US); Rod D. Waltermann, Rougemont, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 445 days.

(21) Appl. No.: 12/751,581

(22) Filed: Mar. 31, 2010

(65) Prior Publication Data

US 2011/0246815 A1 Oct. 6, 2011

(51) Int. Cl.
*G06F 11/07* (2006.01)

(52) U.S. Cl.
USPC ........... 714/4.11; 718/105; 709/208; 709/209

(58) Field of Classification Search
USPC ......................................... 714/4.11; 718/105
See application file for complete search history.

(56) References Cited

U.S. PATENT DOCUMENTS

| | | | |
|---|---|---|---|
| 7,159,234 B1 * | 1/2007 | Murphy et al. | 725/87 |
| 2002/0156893 A1 * | 10/2002 | Pouyoul et al. | 709/225 |
| 2003/0041141 A1 * | 2/2003 | Abdelaziz et al. | 709/223 |
| 2004/0019680 A1 * | 1/2004 | Chao et al. | 709/226 |
| 2006/0209677 A1 * | 9/2006 | McGee et al. | 370/216 |
| 2009/0037584 A1 | 2/2009 | Peterson et al. | |
| 2009/0063665 A1 * | 3/2009 | Bagepalli et al. | 709/222 |
| 2009/0063893 A1 * | 3/2009 | Bagepalli et al. | 714/4 |
| 2009/0138576 A1 * | 5/2009 | Sekimoto et al. | 709/219 |
| 2009/0222690 A1 * | 9/2009 | Seelig et al. | 714/15 |
| 2010/0205476 A1 * | 8/2010 | Burgoyne et al. | 714/2 |
| 2010/0306012 A1 * | 12/2010 | Zyskowski et al. | 705/8 |
| 2011/0029498 A1 * | 2/2011 | Ferguson et al. | 707/703 |
| 2011/0197198 A1 * | 8/2011 | Kanso et al. | 718/105 |

* cited by examiner

*Primary Examiner* — Chae Ko
(74) *Attorney, Agent, or Firm* — Kunzler Law Group (57) ABSTRACT

An apparatus, method, and computer readable storage medium are disclosed to recover from lost resources in a distributed server environment. A status monitor module receives, at a first computer, periodic status messages from a peer computer. Each periodic status message indicates that the peer computer is providing a service for which the first computer serves as a backup service provider. A failure detection module determines, based on the periodic status messages, that the peer computer has stopped providing the service. An advancement module provides the service, at the first computer, in response to determining that the peer computer has stopped providing the service.

22 Claims, 7 Drawing Sheets

RECOVERING FROM LOST RESOURCES IN A DISTRIBUTED SERVER ENVIRONMENT

BACKGROUND

1. Field

The subject matter disclosed herein relates to recovering from lost computer resources and more particularly relates to recovering from lost computer resources in a distributed server environment.

2. Description of the Related Art

As computer applications and services move to the cloud, an increasing number of dedicated servers are being used to provide cloud-based applications and services. These dedicated servers often host applications and services that can be accessed over a local network or over the Internet. Some of these services support the network itself, while others are directed to end users.

Accessing services and applications over a network has many benefits. For example, network services and applications can reduce costs, centralize data storage, simplify system maintenance and updates, give users more mobility, and facilitate collaboration between users. Additionally, other dedicated servers provide services like domain name system ("DNS") services, dynamic host configuration protocol ("DHCP") services, and the like that support networks themselves.

Using a dedicated server, however, to provide these services and applications over a network has some disadvantages. When a dedicated server is shut down or fails, the services and applications may be unavailable to users across the entire network. A dedicated server may also lack scalability, requiring hardware upgrades to increase performance or capacity.

SUMMARY

From the foregoing discussion, there is a need for an apparatus, method, and computer readable storage medium that provide a distributed server environment. Such an apparatus, method, and computer readable storage medium also recover from lost resources in the distributed server environment.

A method is presented, that includes a plurality of steps. In one embodiment, the method includes receiving, at a first computer, periodic status messages from a peer computer. In a further embodiment, each periodic status message indicates that the peer computer is providing a service. The method, in another embodiment, includes determining, based on the periodic status messages, that the peer computer has stopped providing the service. In a further embodiment, the method includes providing the service, at the first computer, in response to determining that the peer computer has stopped providing the service.

An apparatus is provided with a plurality of modules configured to functionally execute the steps of the method. The modules, in one embodiment, include a status monitor module, a failure detection module, and an advancement module.

In one embodiment, the status monitor module receives, at a first computer, periodic status messages from a peer computer. Each periodic status message, in a further embodiment, indicates that the peer computer is providing a service. In another embodiment, the failure detection module determines, based on the periodic status messages, that the peer computer has stopped providing the service. In one embodiment, the advancement module provides the service, at the first computer, in response to determining that the peer computer has stopped providing the service.

A computer readable storage medium is also presented. The computer readable storage medium stores computer executable program code on a tangible storage device. The computer executable program code is executable to perform operations. In one embodiment, the operations are substantially similar to the steps of the method described above.

The operations, in one embodiment, include receiving, at a first computer, periodic status messages from a peer computer. In another embodiment, each periodic status message indicates that the peer computer is providing a service. In a further embodiment, the operations include determining, based on the periodic status messages, that the peer computer has stopped providing the service. The operations, in another embodiment, include providing the service, at the first computer, in response to determining that the peer computer has stopped providing the service.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer executable programs stored on tangible storage devices, and/or execute programmed functions. Modules may also include a computer readable storage medium comprising a computer executable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
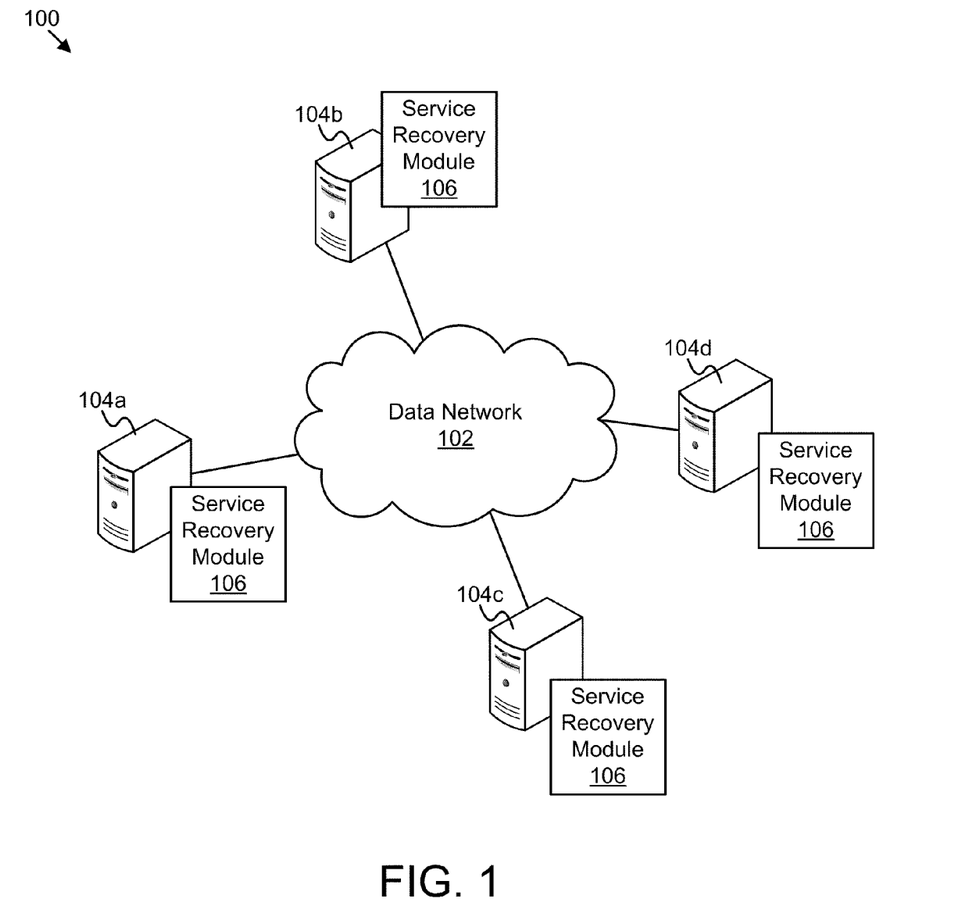
FIG. 1 is a schematic block diagram illustrating one embodiment of a system for recovering from lost resources in a distributed server environment.

FIG. 1 depicts one embodiment of a system 100 for recovering from lost resources in a distributed server environment. In the depicted embodiment, the system 100 includes a data network 102 and a group of peer computers 104. As depicted, each peer computer 104 includes a service recovery module 106. In one embodiment, the system 100 is configured as a distributed server environment. A distributed server environment, also referred to as a serverless environment, is a group of autonomous computers that interact with each other to provide services over a data network. A distributed server environment spreads the load of providing the services across the group of computers instead of consolidating the load in a single centralized server computer. The service recovery modules 106 cooperate to allocate the services among the group of peer computers 400 to ensure that the system 100 continues to provide the services, even if a peer computer 104a-d is shut down or experiences a failure.

In one embodiment, the peer computers 104a-d interact over the data network 102 to provide one or more services over the data network 102. In one embodiment, the data network 102 transmits communications signals between the peer computers 104a-d, allowing each peer computer 104a-d to provide services to other peer computers 104a-d. The data network 102, in a further embodiment, transmits communications signals both between the group of peer computers 104 and from the group of peer computers 104 to other computers and/or communications devices. In one embodiment, this allows the other computers and/or communications devices to access one or more services that the group of peer computers 104 provides. In various embodiments, the data network 102 may include a wired network, a wireless network, a local area network ("LAN"), a wide area network ("WAN"), the Internet, and/or another type of communications network.

The peer computers 104a-d from the group of peer computers 104, in one embodiment, are each computing devices that include a processor, volatile memory, non-volatile data storage, and/or other computing components. For example, in various embodiments, the peer computers 104a-d may include dedicated server computers, desktop computers, laptop computers, handheld computing devices, mobile telephones, video game systems, mobile entertainment devices, set-top boxes, and/or other computing devices capable of providing and/or accessing a service. In the depicted embodiment, the group of peer computers 104 includes a first peer computer 104a, a second peer computer 104b, a third peer computer 104c, and a fourth peer computer 104d. In other embodiments, the group of peer computers 104 may include a number of computers from a single computer up to hundreds or thousands of computers. The number of peer computers 104a-d included in the group of peer computers 104, in one embodiment, changes dynamically as peer computers 104a-d are booted up and/or shut down.

In one embodiment, the peer computers 104a-d include user workstations. Unlike a dedicated server, a user workstation is a computing device that is primarily used by a user for performing computing tasks. A user workstation typically includes a display and one or more user input devices to facilitate interaction with a user. For example, in one embodiment, the peer computers 104a-d include user workstations in an office space, in a computer lab, in a library, or in another shared location. Configuring user workstations as a distributed server environment, in one embodiment, allows the system 100 to provide services without dedicated servers. In a further embodiment, configuring user workstations as a distributed server environment allows the system 100 to scale with demand for services, because active user workstations, the peer computers 104a-d, may act as both servers and clients, meaning that adding an additional client also adds additional server capacity.

The peer computers 104a-d, in one embodiment, provide one or more services. The peer computers 104a-d provide the services, in a further embodiment, over the data network 102. A service, as used herein, is a computer-provided function that is accessible to another computer. Examples of services, in one embodiment, may include a domain name system ("DNS") service, a dynamic host configuration protocol ("DHCP") service, a lightweight directory access protocol ("LDAP") service, an authentication service, a directory service, an e-mail service, a web server service, a printing service, a file system service, network applications, cloud computing services, and the like.

In one embodiment, one or more of the peer computers 104a-d provide a service, and one or more of the other peer computers 104a-d serve as backup service providers for the service. This arrangement allows the group of peer computers 104 to continue to provide a service even if an individual peer computer 104a-d is shut down, experiences a service failure, or otherwise stops providing the service. In another embodiment, a peer computer 104a-d serving as a primary backup service provider may have an additional peer computer 104a-d that serves as a secondary backup service provider, and so on. A peer computer 104a-d may both provide one or more services and also serve as a backup service provider for one or more additional services.

In a further embodiment, several of the peer computers 104a-d may provide the same service, and client computers may access the service based on a predefined load-balancing algorithm, such as round robin, split-horizon, random selection, and the like. In an embodiment where several of the peer computers 104a-d provide the same service, each of the several peer computers 104a-d may have one or more backups, one or more peer computers 104a-d may serve as backups for each of the several peer computers 104a-d, or the several peer computers 104a-d may have no additional backups, serving as backups for each other.

In the depicted embodiment, each peer computer 104a-d includes a service recovery module 106. The service recovery module 106 is described in greater detail with regard to FIGS. 2 and 3. In general, the service recovery module 106 allocates services and/or backup services between the peer computers 104a-d to ensure that services continue even when a peer computer 104a-d stops providing a service. In one embodiment, each of the peer computers 104a-d includes a service recovery module 106, as depicted, and the service recovery modules 106 each work in parallel. In a further embodiment, in response to a determination that a peer computer 104a-d has stopped a service, a peer computer 104a-d is selected as a temporary master computer, and the service recovery module 106 corresponding to the temporary master computer allocates the services and/or backup services for the group of peer computers 104. In one embodiment, the service recovery module 106 performs one or more balancing procedures to allocate the service and/or backup services.

Figure 2:
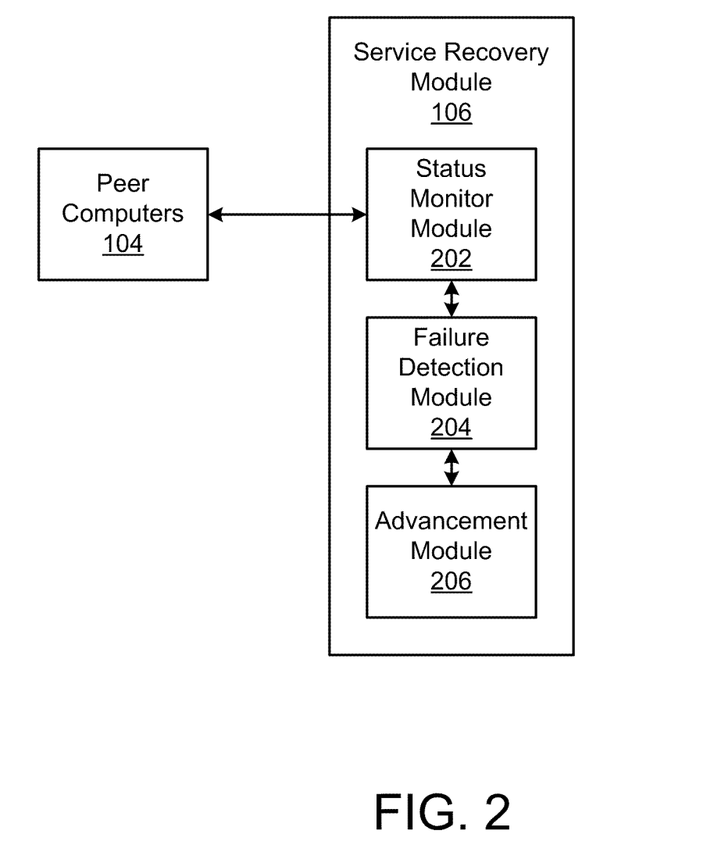
FIG. 2 is a schematic block diagram illustrating one embodiment of a service recovery module.

FIG. 2 depicts one embodiment of the service recovery module 106. In the depicted embodiment, the service recovery module 106 includes a status monitor module 202, a failure detection module 204, and an advancement module 206. The service recovery module 106, in one embodiment, is substantially similar to the service recovery modules 106 described with regard to FIG. 1, and may be integrated with, installed on, or otherwise in communication with one or more peer computers 104a-d to allocate services and/or backup services provided by the group of peer computers 104.

In one embodiment, the status monitor module 202 receives periodic status messages, or heartbeat signals, from one or more of the peer computers 104a-d. A periodic status message, in one embodiment, indicates that a peer computer 104a-d is providing a service. In one embodiment, a periodic status message includes a unique identifier of a peer computer 104a-d. For example, in one embodiment, a periodic status message may include a unique network address, such as an Internet protocol ("IP") address or a hostname, or another unique identifier corresponding to a peer computer 104a-d, such that the status monitor module 202 may determine that the peer computer 104a-d continues to provide a service. In one embodiment, the status monitor module 202 stores a record of services and/or backup services provided by each peer computer 104a-d, and receiving a periodic status message from a peer computer 104a-d indicates that the peer computer 104a-d continues to provide services stored for the peer computer 104a-d in the record.

In a further embodiment, a periodic status message may include a current status of one or more services that a peer computer 104a-d provides. In one embodiment, the current status of a service is a name of the service, and a periodic status message may include a listing of services that a peer computer 104a-d provides. In a further embodiment, the current status may include additional information, such as an amount of time that a peer computer 104a-d has provided the service, processor usage by the service, memory usage by the service, and/or other information corresponding to the service. In another embodiment, each periodic status message includes a listing of one or more services for which a peer computer 104a-d serves as a backup service provider.

In one embodiment, the one or more peer computers 104a-d send periodic status messages to the status monitor modules 202 of other peer computers 104a-d over the data network 102. The one or more peer computers 104a-d may send the periodic status messages using a broadcast address such that each peer computer 104a-d receives the periodic status messages, to each peer computer 104a-d individually, or using another messaging protocol. In another embodiment, a peer computer 104a-d sends periodic status messages to another computer, module, or device that processes and/or forwards the periodic status messages or information extracted from the periodic status messages to the status monitor modules 202 of the other peer computers 104a-d.

The status monitor module 202, in one embodiment, receives periodic status messages only from peer computers 104a-d that provide services for which the peer computer 104a-d corresponding to the status monitor module 202 serves as a backup service provider. For example, if the first peer computer 104a is a backup service provider for a service provided by the second peer computer 104b, but not for services provided by the third peer computer 104c or the fourth computer 104d, in one embodiment, the status monitor module 202 corresponding to the first computer 104a may only receive periodic status messages from the second peer computer 104b. In a further embodiment, the status monitor module 202 receives periodic status messages from each peer computer 104a-d that is active, regardless of services for which the peer computer 104a-d corresponding to the status monitor module 202 serves as a backup service provider.

In one embodiment, the failure detection module 204 determines that a peer computer 104a-d has stopped providing a service. In a further embodiment, the service is a service for which a peer computer 104a-d corresponding to the failure detection module 204 serves as a backup service provider. The failure detection module 204, in another embodiment, determines that a peer computer 104a-d has stopped providing the service based on the periodic status messages.

In one embodiment, the failure detection module 204 determines that a peer computer 104a-d has stopped providing a service by determining that the peer computer 104a-d has failed to send a periodic status message. The failure detection module 204, in a further embodiment, may determine that the peer computer 104a-d has failed to send a periodic status message in response to a predefined amount of time passing since the status monitor module 202 has received a periodic status message from the peer computer 104a-d. In another embodiment, the failure detection module 204 waits for several consecutive missed periodic status messages from the peer computer 104a-d before determining that the peer computer 104a-d has stopped providing a service.

In one embodiment, the failure detection module 204 determines that a peer computer 104a-d has stopped providing a service based on contents of a periodic status message from the peer computer 104a-d. For example, in one embodiment, a peer computer 104*a*-*d* may be functioning, and able to send a periodic status message, but a specific service may have failed. The peer computer 104*a*-*d*, in the example embodiment, may send a periodic status message that includes a failure indicator, such as a code, a key, a flag, or the like, that indicates that the peer computer 104*a*-*d* has stopped providing the service. In one embodiment, the failure detection module 204 waits for several consecutive periodic status messages indicating that the peer computer 104*a*-*d* has stopped providing the service before determining that the peer computer 104*a*-*d* has stopped providing the service to give the peer computer 104*a*-*d* time to recover and begin providing the service again.

In one embodiment, the advancement module 206 provides, or causes a peer computer 104*a*-*d* corresponding to the advancement module 206 to provide, a service in response to the failure detection module 204 determining that a different peer computer 104*a*-*d* has stopped providing the service. In a further embodiment, the advancement module 206 causes a peer computer 104*a*-*d* corresponding to the advancement module 206 to begin serving as a backup service provider for a service in response to a periodic status message from a different peer computer 104*a*-*d* indicating that the different peer computer 104*a*-*d* has begun providing the service.

For example, in one embodiment, the first peer computer 104*a* may provide a service, the second peer computer 104*b* may serve as a primary backup service provider for the service, and the third peer computer 104*c* may serve as a secondary backup service provider for the service. In the example, if the first peer computer 104*a* stops providing the service due to a shutdown or failure, in one embodiment the advancement module 206 corresponding to the second peer computer 104*b* will cause the second peer computer 104*b* to begin providing the service and the advancement module 206 corresponding to the third peer computer 104*c* will cause the third peer computer 104*c* to begin serving as the primary backup service provider for the service. In a further embodiment, the fourth peer computer 104*d* may serve as a third backup service provider, and the advancement module 206 corresponding to the fourth peer computer 104*d* may cause the fourth peer computer 104*d* to begin serving as the secondary backup service provider.

Figure 3:
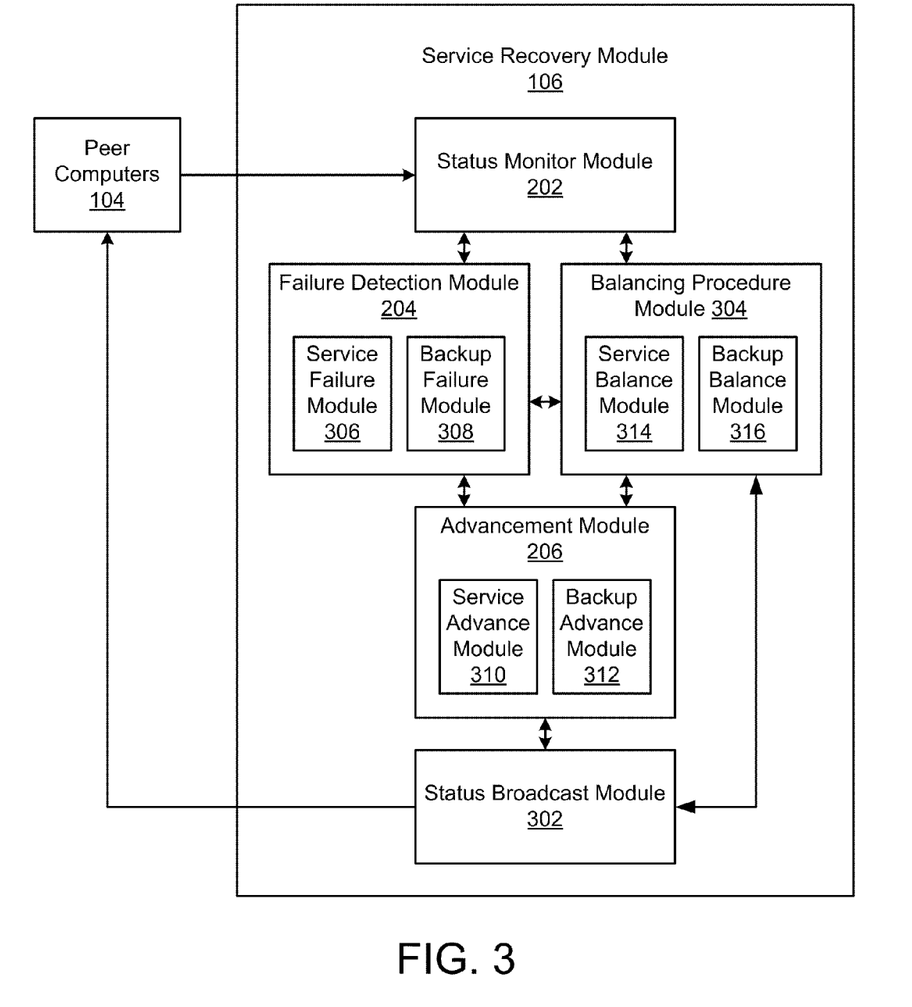
FIG. 3 is a schematic block diagram illustrating another embodiment of a service recovery module.

FIG. 3 depicts another embodiment of the service recovery module 106. In the depicted embodiment, the service recovery module 106 includes the status monitor module 202, the failure detection module 204, and the advancement module 206 as described with regard to FIG. 2, and further includes a status broadcast module 302 and a balancing procedure module 304.

As described with regard to FIG. 2, in general the failure detection module 204 determines that a peer computer 104*a*-*d* has stopped providing a service. In the depicted embodiment, the failure detection module 204 further includes a service failure module 306 and a backup failure module 308. In one embodiment, the service failure module 306 determines that a peer computer 104*a*-*d* has stopped providing a service, and the backup failure module 308 determines that a peer computer 104*a*-*d* has stopped serving as a backup service provider for a service.

For example, in one embodiment, a peer computer 104*a*-*d* may stop serving as a backup service provider for a service in response to a shutdown or failure, in response to the peer computer 104*a*-*d* beginning to provide the service, or the like. Depending on the reason that the peer computer 104*a*-*d* stops serving as a backup service provider, the backup failure module 308 may determine that the peer computer 104*a*-*d* has stopped serving as the backup service provider based on a current status of a service in a periodic status message, based on the peer computer 104*a*-*d* failing to send a periodic status message, or the like. For example, in one embodiment, the backup failure module 308 may determine that the peer computer 104*a*-*d* has stopped serving as the backup service provider based on a current status of a service in a periodic status message indicating that the peer computer 104*a*-*d* is currently providing a service, and is no longer the backup service provider for the service.

As described with regard to FIG. 2, in general, the advancement module 206 provides, or causes a peer computer 104*a*-*d* corresponding to the service recovery module 106 to provide, a service in response to the failure detection module 204 determining that a peer computer 104*a*-*d* has stopped providing the service. In the depicted embodiment, the advancement module 206 includes a service advance module 310 and a backup advance module 312.

In one embodiment, the service advance module 310 causes a peer computer 104*a*-*d* corresponding to the service recovery module 106 to advance from serving as a backup service provider for a service to providing the service, and the backup advance module 312 causes a peer computer 104*a*-*d* corresponding to the service recovery module 106 to advance from serving as a secondary service provider for a service to serving as a primary service provider for the service. In one embodiment, the backup advance module 312 causes a peer computer 104*a*-*d* corresponding to the service recovery module 106 to serve as a backup service provider for a service in response to the backup failure module 308 determining that a different peer computer 104*a*-*d* has stopped serving as the backup service provider for the service.

In one embodiment, the status broadcast module 302 sends outgoing periodic status messages from a peer computer 104*a*-*d* corresponding to the service recovery module 106 to one or more of the other peer computers 104*a*-*d*. The status broadcast module 302, in one embodiment, sends periodic status messages to each of the other peer computers 104*a*-*d*. In a further embodiment, the status broadcast module 302 sends periodic status messages to one or more peer computers 104*a*-*d* that serve as backup service providers for one or more services or backup services that the peer computer 104*a*-*d* corresponding to the service recovery module 106 provides.

In one embodiment, the status broadcast module 302 sends the periodic status messages to the status monitor modules 202 of other peer computers 104*a*-*d* over the data network 102. The status broadcast module 302, in one embodiment, may send the periodic status messages using a broadcast address such that each peer computer 104*a*-*d* receives the periodic status messages, to each peer computer 104*a*-*d* individually, or using another messaging protocol. In a further embodiment, the status broadcast module 302 sends the periodic status messages to another computer, module, or device that processes and/or forwards the periodic status messages or information extracted from the periodic status messages to the status monitor modules 202 of the other peer computers 104*a*-*d*.

Periodic status messages, or heartbeat signals, are described with regard to the status monitor module 202 of FIG. 2. A periodic status message, in one embodiment, indicates that a peer computer 104*a*-*d* is providing a service, and may includes a unique identifier of the peer computer 104*a*-*d*, such as an Internet protocol ("IP") address, a hostname, or another unique identifier corresponding to the peer computer 104*a*-*d*.

A periodic status message, in a further embodiment, includes a current status of one or more services that a peer computer 104*a*-*d* provides, such as a name of the service, an amount of time that a peer computer 104a-d has provided the service, processor usage by the service, memory usage by the service, and/or other information corresponding to the service. A periodic status message, in a further embodiment, may include a listing of and/or a current status for one or more services for which the peer computer 104a-d corresponding to the service recovery module 106 serves as a backup service provider. In one embodiment, the status broadcast module 302 sends out a single periodic status message for a group of services and/or backup services provided by the corresponding peer computer 104a-d. In a further embodiment, the status broadcast module 302 sends out several periodic status messages for individual services and/or backup services provided by the corresponding peer computer 104a-d.

The frequency of the periodic status messages that the status broadcast module 302 sends, in one embodiment, may be selected based on a priority of the corresponding services. For example, in one embodiment, if a service has a high priority, to minimize downtime of the service, the status broadcast module 302 may send periodic status messages at a high frequency, for example up to once every ten seconds, once a second, several times a second, or more. In another example, in one embodiment, if a service has a low priority, and downtime of the service is not an urgent matter, the status broadcast module 302 may send periodic status messages corresponding to the service at a low frequency, once an hour, once a day, once a week, or less.

In one embodiment, the balancing procedure module 304 performs a balancing procedure to balance or redistribute the services and/or backup services between the peer computers 104a-d. The balancing procedure, in one embodiment, ensures that the load that the services and/or backup services place on the peer computers 104a-d is substantially balanced, that a single peer computer 104a-d does not simultaneously provide a service and serve as a backup service provider for the same service, and the like. In a further embodiment, the balancing procedure module 304 performs a series of repeated balancing procedures, for example performing one or more balancing procedures for services, and performing one or more balancing procedures for each level of backup services.

The balancing procedure, in one embodiment, is based on a comparison of one or more factors relating to the peer computers 104a-d. In one embodiment, the balancing procedure module 304 determines a numerical value for each factor and sums the values to create a total. In a further embodiment, the balancing procedure module 304 assigns a weight to each factor to scale the factors relative to other factors. The balancing procedure module 304, in one embodiment, determines a total, relative to a service, for each peer computer 104a-d. The total of the factors, in one embodiment, represents a number of votes for a peer computer 104a-d. In one embodiment, a peer computer 104a-d with a highest total, or number of votes, begins providing the corresponding service. In a further embodiment, a peer computer 104a-d with a lowest total, a total closest to a target value, or the like, begins providing the corresponding service.

In one embodiment, the factors include a history of a peer computer 104a-d providing the service. The history, in one embodiment, may be represented as an inverse of one plus an amount of time since the peer computer 104a-d has provided the service, a total amount of time that the peer computer 104a-d has provided the service, or the like. In a further embodiment, the history may be weighted or scaled.

The factors, in one embodiment, include a total number of services that a peer computer 104a-d currently provides. The total number of services provided, in one embodiment, may be subtracted from a scaling or weighting factor, multiplied by a scaling or weighting factor, or otherwise scaled or weighted. In a further embodiment, the factors include a total number of services for which a peer computer 104a-d serves as a backup service provider. The total number of backup services, in one embodiment, may be subtracted from a scaling or weighting factor, multiplied by a scaling or weighting factor, or otherwise scaled or weighted.

In a further embodiment, the factors include a random seed factor. The random seed factor, in one embodiment, is calculated for each peer computer 104a-d substantially randomly. A random seed factor, in one embodiment, reduces a chance of a tie between different peer computers 104a-d in the comparison, if the other factors are equal. In another embodiment, the random seed factor may be weighted or scaled. In one embodiment, the random seed factor is determined once for each of the peer computers 104a-d and used by the balancing procedure module 304 in each balancing procedure. By using consistent random seed factors for each peer computer 104a-d, balancing procedure modules 304 corresponding to different peer computers 104a-d can prevent ties while still obtaining the same results as other balancing procedure modules 304.

In one embodiment, a peer computer 104a-d with a highest total, a lowest total, a total closest to a target value, or the like, begins or continues providing a corresponding service and the other peer computers 104a-d do not provide the corresponding service. If one of the other peer computers 104a-d was providing the corresponding service prior to the comparison, in one embodiment, the peer computer 104a-d that was providing the corresponding service stops providing the corresponding service in response to the balancing procedure.

As described in regard to FIG. 1, in one embodiment, each of the peer computers 104a-d includes a service recovery module 106. In one embodiment, each peer computer 104a-d, using the balancing procedure module 304, performs a balancing procedure in parallel to reach similar results. For example, in one embodiment, the balancing procedure module 304 and/or the status monitor module 202 may record and track each of the factors for each of the peer computers 104a-d. In another embodiment, for example, the status broadcast module 302 may send the factors for the corresponding peer computer 104a-d to the other peer computers 104a-d. In one embodiment, because the balancing procedure modules 304 corresponding to each of the peer computers 104a-d reach similar results, a service may be transferred without a handshake or other communications between peer computers 104a-d, as one peer computer 104a-d begins providing a service and another peer computer 104a-d stops providing the service.

In another embodiment, one of the peer computers 104a-d is selected as a temporary master computer and the selected peer computer 104a-d performs the balancing procedure for the group of peer computers 104. In various embodiments, a peer computer 104a-d may be selected as a temporary master computer randomly, by a vote of the peer computers 104a-d, based on a round-robin rotation or other schedule, or by another selection method. In one embodiment, the balancing procedure module 304 of the peer computer 104a-d that is selected as the temporary master computer performs one or more balancing procedures and assigns the peer computers 104a-d to provide services and to serve as backup service providers based on the one or more balancing procedures. In another embodiment, the peer computer 104a-d that is selected as the temporary master computer ceases to act as the temporary master computer in response to making the assignments.

In one embodiment, the balancing procedure module 304 initiates a balancing procedure in response to a peer computer 104a-d providing at least two more services and/or backup services than another peer computer 104a-d. If a peer computer 104a-d is providing at least two more services and/or backup services than another peer computer 104a-d, the services and/or backup services can be further balanced. For example, in one embodiment, the balancing procedure module 304 may initiate a balancing procedure if the first peer computer 104a is providing three services while the other peer computers 104b-d are each providing one service, because assigning one of the services from the first peer computer 104a to one of the other peer computers 104b-d will better balance the services. In the example embodiment, if the first peer computer 104a is providing two services while the other peer computers 104b-d are each providing one service, the balancing procedure module 304 may not initiate a balancing procedure, because the services cannot be further balanced.

The balancing procedure module 304, in one embodiment, repeats the balancing procedure for each service that the group of peer computers 104 provides. In one embodiment, the balancing procedure module 304 repeats the balancing procedure in response to a peer computer 104a-d providing a service and concurrently serving as a backup service provider for the service, reassigning either the service, the backup service, or both. In a further embodiment, the balancing procedure module 304 repeats the balancing procedure one or more additional times for a plurality of backup services.

In the depicted embodiment, the balancing procedure module 304 includes a service balance module 314 and a backup balance module 316. In one embodiment, the service balance module 314 performs one or more balancing procedures to balance the allocation of services that the peer computers 104a-d provide, as described above, and the backup balance module 316 performs one or more balancing procedures to balance the allocation of backup service providers for the services.

The backup balance module 316, in one embodiment, performs one or more balancing procedures for backup service providers in response to the service balance module 314 reaching a stable balance of the services between the peer computers 104a-d. In one embodiment, the backup balance module 304 performs a balancing procedure for backup service providers substantially as described with regard to the balancing procedures for the services. In one embodiment, where a target amount of backup service providers for a given service do not exist, the backup balance module 316 assigns new backup service providers during a balance procedure. An example of the balancing procedure module 304 performing repeated balancing procedures using the service balance module 314 and the backup balance module 316 is described with regard to FIG. 4.

Figure 4:
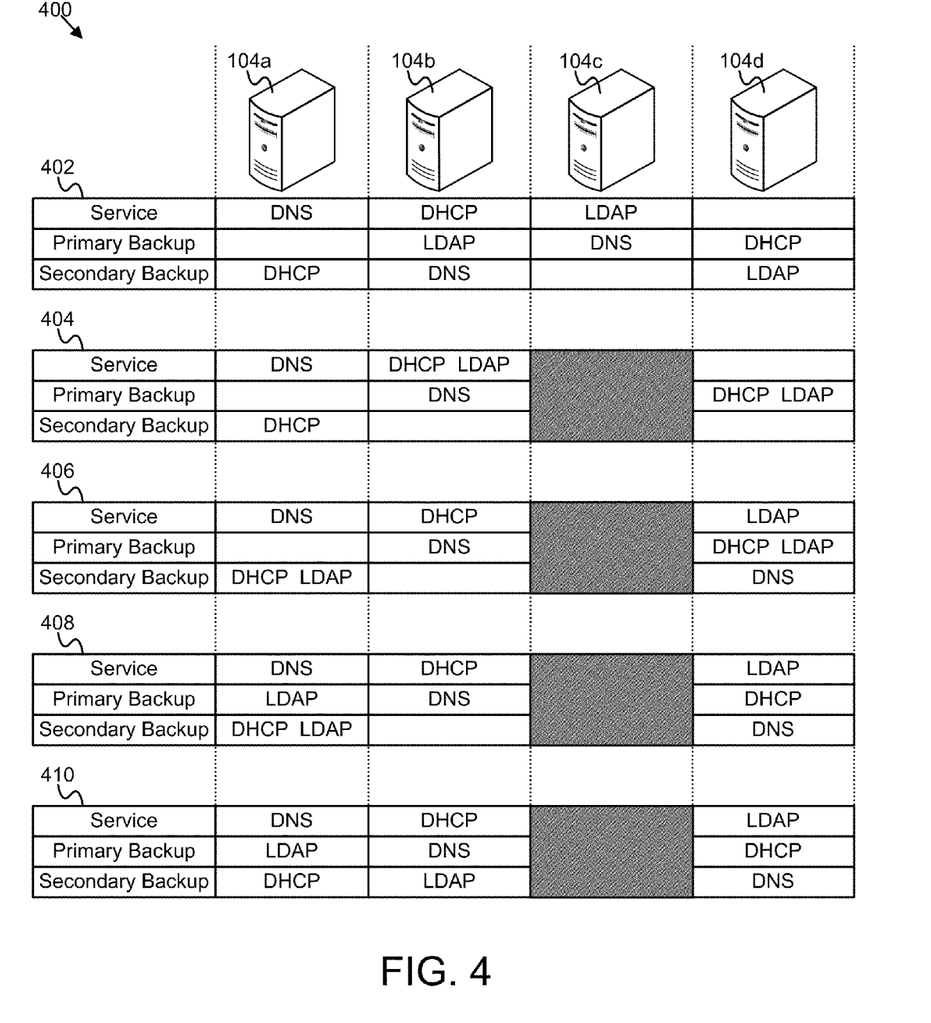
FIG. 4 is a schematic block diagram illustrating one embodiment of a balancing procedure.

FIG. 4 depicts one embodiment 400 of a balancing procedure. The depicted embodiment 400 includes a first state 402, a second state 404, a third state 406, a fourth state 408, and a fifth state 410. The peer computers 104a-d, in the depicted embodiment 400, provide three services, a DNS service, a DHCP service, and an LDAP service, and each service has a primary backup service provider and a secondary backup service provider. Although the first state 402, the second state 404, the third state 406, the fourth state 408, and the fifth state 410 are depicted separately and described in a particular order, in other embodiments, one or more of the different states and corresponding steps may occur simultaneously, may occur in different orders, may be skipped, or may otherwise differ from the depicted embodiment 400.

In the first state 402, in the depicted embodiment 400, the services are balanced between the peer computers 104a-d with no peer computer 104a-d providing at least two more services than another peer computer 104a-d, and no peer computer 104a-d concurrently providing a service and serving as a backup service provider for the service. In the first state 402, because the peer computers 104 are providing three services and there are four peer computers 104a-d, the fourth peer computer 104d is not providing a service. Because the services, the primary backups, and the secondary backups are balanced and stable in the first state 402, the balancing procedure module 304 does not initiate a balancing procedure.

In the second state 404, in the depicted embodiment 400, the third peer computer 104c is shut down. For example, in one embodiment, the third peer computer 104c is a user workstation, and a user of the third peer computer 104c shuts it down after completing use for the day. Because the third peer computer 104c is shut down, in the second state 404 the third peer computer 104c stops providing the LDAP service and stops serving as the primary backup service provider for the DNS service.

In the second state 404, the advancement module 206 of the second peer computer 104b causes the second peer computer 104b to begin providing the LDAP service in response to the failure detection module 204 of the second peer computer 104b determining that the third peer computer 104c has stopped providing the LDAP service. Similarly, in the second state 404, the advancement module 206 of the fourth peer computer 104d causes the fourth peer computer 104d to begin serving as the primary backup service provider for the LDAP service in response to the failure detection module 204 of the fourth peer computer 104d determining that the second peer computer 104b has stopped serving as the primary backup service provider for the LDAP service and begun providing the LDAP service.

In the second state 404, in the depicted embodiment 400, the group of peer computers 104 continues to provide each of the services, with at least a primary backup for each of the services, but the services and backups are not balanced between the peer computers 104a,b,d. In response to determining that the second peer computer 104b is providing at least two more services than the fourth peer computer 104d provides, either the balancing procedure module 304 for each active peer computer 104a,b,d or of a single selected temporary master peer computer 104a,b,d, initiates a balancing procedure.

The results of the balancing procedure for the services are depicted in the third state 406. In the third state 406, in the depicted embodiment 400, as a result of the balancing procedure, the fourth peer computer 104d begins providing the LDAP service and the second peer computer 104b stops providing the LDAP service. Additionally, as depicted in the third state 406, in response to the balancing procedure the first peer computer 104a begins serving as the secondary backup service provider for the LDAP service, because there was no secondary backup service provider for the LDAP service in the second state 404.

In the third state 406, the services are balanced between the active peer computers 104a,b,d. However, in the third state 406, the primary backup service providers are not balanced because the fourth peer computer 104d is serving as the backup service provider for at least two more services than the first peer computer 104a. Additionally, the fourth peer computer 104d both provides the LDAP service and serves as the primary backup service provider for the LDAP service. In response to determining that the fourth peer computer 104d is serving as the primary backup for at least two more services than the first peer computer 104a and/or in response to determining that the fourth peer computer 104d is both providing and serving as the primary backup for the LDAP service, either the balancing procedure module 304 for each active peer computer 104a,b,d or of a single selected temporary master peer computer 104a,b,d, initiates a second balancing procedure. The second balancing procedure, in the depicted embodiment 400, is performed on the primary backup service providers.

The results of the balancing procedure for the primary backup service providers are depicted in the fourth state 408. In the fourth state 408, in the depicted embodiment 400, the first peer computer 104a begins serving as the primary backup service provider for the LDAP service in response to the second balancing procedure. The second balancing procedure balances the primary backup service providers and stops the fourth peer computer 104d from providing the LDAP service and concurrently serving as the primary backup service provider for the LDAP service.

However, in the fourth state 408, the secondary backup service providers are not balanced, and the first peer computer 104a serves as both the primary and secondary backup service provider for the LDAP service. In response to determining that the first peer computer 104a is serving as the secondary backup for at least two more services than the second peer computer 104b and/or in response to determining that the first peer computer 104a is serving as both the primary and secondary backup service provider for the LDAP service, either the balancing procedure module 304 for each active peer computer 104a,b,d or of a single selected temporary master peer computer 104a,b,d, initiates a third balancing procedure. The third balancing procedure, in the depicted embodiment 400, is performed on the secondary backup service providers.

The results of the balancing procedure for the secondary backup service providers are depicted in the fifth state 410. In the fifth state 410, in the depicted embodiment 400, the second peer computer 104b begins serving as the secondary backup service provider for the LDAP service in response to the third balancing procedure. The third balancing procedure balances the secondary backup service providers and stops the first peer computer 104a from concurrently serving as both the primary and secondary backup service provider for the LDAP service.

In the fifth state 410, the services, the primary services, and the secondary services are balanced and no active peer computer 104a,b,d is serving as a backup to itself. The balancing procedure module 304 for each active peer computer 104a,b,d or of a single selected temporary master peer computer 104a,b,d does not initiate any further balancing procedures in response to the allocation of services and backups in the fifth state 410. In an embodiment where an active peer computer 104a,b,d was selected as a temporary master computer, in one embodiment, the temporary master computer ceases to serve as the temporary master computer in response to determining that the services and backup service providers are balanced and stable.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
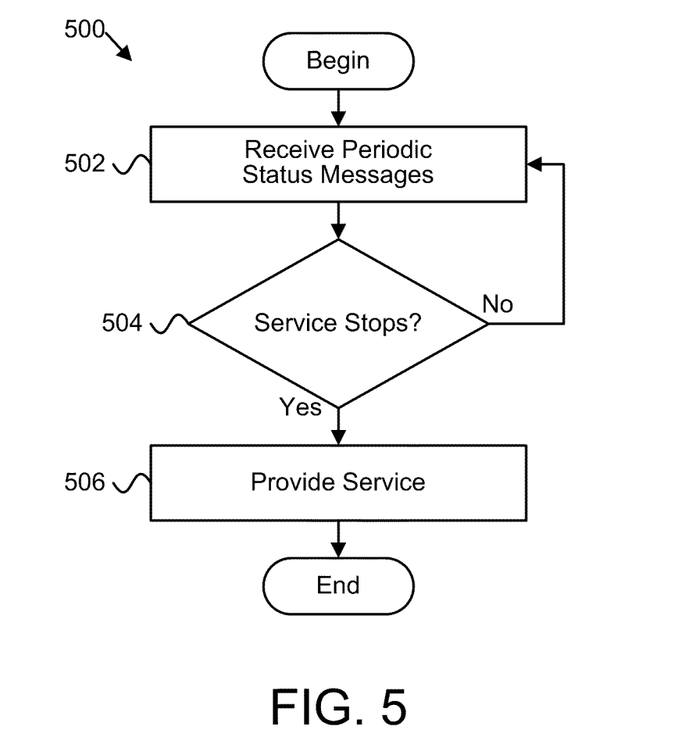
FIG. 5 is a schematic flow chart illustrating one embodiment of a method for recovering from lost resources in a distributed server environment.

FIG. 5 depicts one embodiment of a method 500 for recovering from lost resources in a distributed server environment. The method 500 substantially includes the steps to carry out the functions presented above with respect to the operation of the described apparatus, system, and method of FIGS. 1, 2, 3, and 4. In one embodiment, the method 500 is implemented with a computer readable storage medium storing computer usable program code on a tangible storage device. The computer readable storage medium may be integrated into a computing system, such as the one or more peer computers 104a-d, and the computer executable program executed by the computing system may perform the method 500. The method 500 is described with regard to a single service recovery module 106, however, in a further embodiment, the method 500 may be performed in parallel by several service recovery modules 106 corresponding to different peer computers 104a-d.

In the depicted embodiment, the method 500 begins, and the status monitor module 202 receives 502 one or more periodic status messages from one or more of the peer computers 104a-d. The failure detection module 204 determines 504, based on the one or more periodic status messages, whether a peer computer 104a-d has stopped providing a service for which a peer computer 104a-d corresponding to the service recovery module 106 serves as a backup service provider.

If the failure detection module 204 determines 504 that a peer computer 104a-d has not stopped providing the service, the status monitor module 202 continues to receive 502 periodic status messages. If the failure detection module 204 determines 504 that a peer computer 104a-d has stopped providing the service, the advancement module 206 causes the peer computer 104a-d corresponding to the service recovery module 106 to provide 506 the service and the method 500 ends. In a further embodiment, instead of being performed for a service, the method 500 may be performed for a backup service provider.

Figure 6:
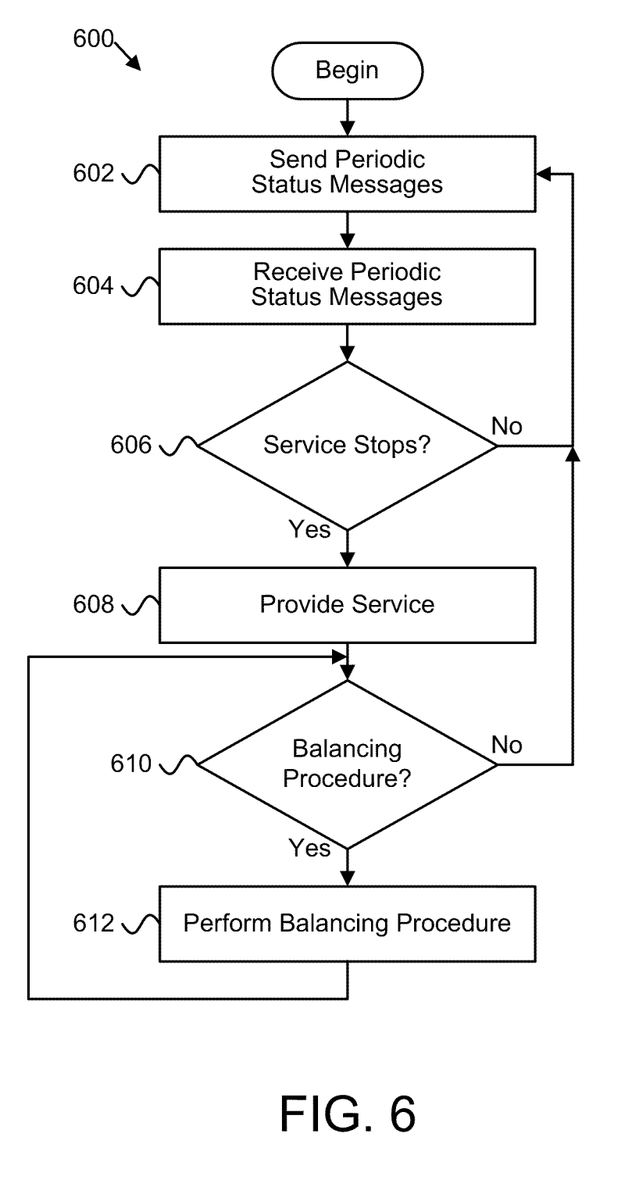
FIG. 6 is a schematic flow chart illustrating another embodiment of a method for recovering from lost resources in a distributed server environment.

FIG. 6 depicts another embodiment of a method 600 for recovering from lost resources in a distributed server environment. The method 600 substantially includes the steps to carry out the functions presented above with respect to the operation of the described apparatus, system, and method of FIGS. 1, 2, 3, and 4. In one embodiment, the method 600 is implemented with a computer readable storage medium storing computer usable program code on a tangible storage device. The computer readable storage medium may be integrated into a computing system, such as the one or more peer computers 104a-d, and the computer executable program executed by the computing system may perform the method 600. Like the method 500, the method 600 is described with regard to a single service recovery module 106. However, in a further embodiment, the method 600 may be performed in parallel by several service recovery modules 106 corresponding to different peer computers 104a-d.

In the depicted embodiment, the method 600 begins, and the status broadcast module 302 sends 602 outgoing periodic status messages to one or more of the peer computers 104a-d to indicate that a peer computer 104a-d corresponding to the service recovery module 106 is providing a service. The status monitor module 202 receives 604 one or more periodic status messages from one or more of the peer computers 104a-d. In one embodiment, the status broadcast module 302 continues to send 602 the outgoing periodic status messages and the status monitor module 202 continues to receive 604 the periodic status messages throughout the method 600, unless a peer computer 104a-d fails, is shut down, or the like.

The failure detection module 204 determines 606, based on the one or more received periodic status messages, whether a peer computer 104a-d has stopped providing a service for which a peer computer 104a-d corresponding to the service recovery module 106 serves as a backup service provider. If the failure detection module 204 determines 606 that a peer computer 104a-d has not stopped providing the service, the status broadcast module 302 continues to send 602 outgoing periodic status messages and the status monitor module 202 continues to receive 604 periodic status messages. If the failure detection module 204 determines 606 that a peer computer 104a-d has stopped providing the service, the advancement module 206 causes the peer computer 104a-d corresponding to the service recovery module 106 to provide 608 the service.

The balancing procedure module 304 determines 610 whether to initiate a balancing procedure. If the balancing procedure module 304 determines 610 not to initiate a balancing procedure, the status broadcast module 302 continues to send 602 outgoing periodic status messages and the status monitor module 202 continues to receive 604 periodic status messages and the method 600 continues.

In one embodiment, the balancing procedure module 304 determines 610 to initiate a balancing procedure in response to a peer computer 104a-d providing at least two more services and/or backup services than another peer computer 104a-d, or in response to a single peer computer 104a-d serving as a backup service provider to itself. If the balancing procedure module 304 determines 610 to initiate a balancing procedure, the balancing procedure module 304 performs 612 the balancing procedure, and the balancing procedure module 304 determines 610 whether to perform an additional balancing procedure. For example, in one embodiment, the balancing procedure module 304 may perform 612 an initial balancing procedure for services provided by the peer computers 104a-d, and may perform 612 additional balancing procedures for primary backup service providers, for secondary backup service providers, and the like. In a further embodiment, instead of being performed for a service, the method 600 may be performed for a backup service provider.

Figure 7:
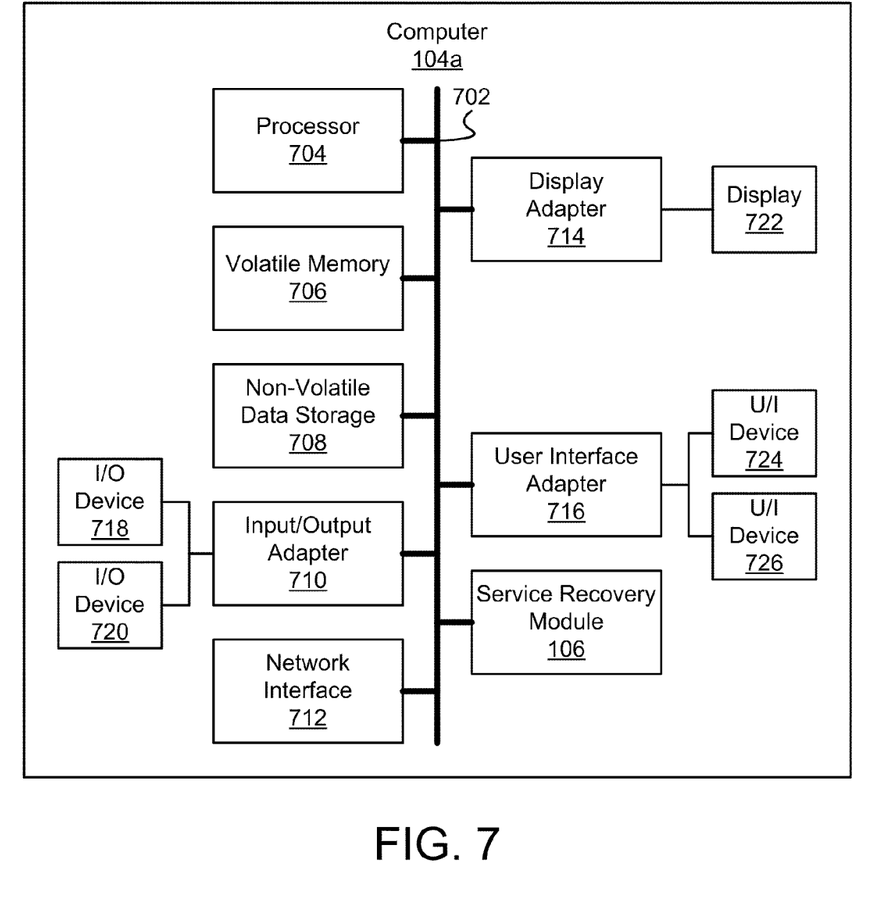
FIG. 7 is a schematic block diagram illustrating one embodiment of a computer.

FIG. 7 depicts one embodiment of a peer computer 104a. As described above with regard to FIG. 1, in one embodiment, the peer computers 104a-d are each computing devices that form a group of peer computers 104. In the depicted embodiment, the peer computer 104a includes a communications bus 702, a processor 704, volatile memory 706, non-volatile data storage 708, an input/output ("I/O") adapter 710, a network interface 712, a display adapter 714, a user interface (U/I) Adapter 716, and the service recovery module 106.

The illustrated I/O adapter 710 is connected to multiple I/O devices 718, 720, such as a printer, an external storage device, and/or another peripheral device. The illustrated display adapter 714 is connected to a display 722, such as a liquid crystal display ("LCD") or other flat panel display, a cathode-ray tube ("CRT") display, or another display device. The illustrated U/I adapter 716 is connected to multiple U/I devices 724, 726, such as a mouse, a touchpad, a keyboard, or the like. The depicted network interface 712, in various embodiments, may include one or more of a telephone modem, a cable modem, a ("DSL") modem, a WAN adapter, a LAN adapter, a wireless Bluetooth adapter, a wireless Wi-Fi adapter, a wireless WAN adapter, or another network interface capable of communicating using the data network 102 or another communications network.

In the depicted embodiment, the peer computer 104a includes the service recovery module 106. The service recovery module 106, in one embodiment, may include hardware circuits that interact with other components of the peer computer 104a. In a further embodiment, the service recovery module 106 may include computer executable program code stored on a tangible storage device, such as the volatile memory 706 and/or the non-volatile data storage 708. Computer executable program code of the service recovery module 106, in one embodiment, performs the functions described above when executed by hardware circuits such as the processor 704 or other components of the peer computer 104a. While the service recovery module 106 is depicted as independently connected to the communications bus 702, in a further embodiment, the service recovery module 106 and/or portions of the service recovery module 106 may be integrated with one or more hardware components of the peer computer 104a, stored in the volatile memory 706 and/or the non-volatile data storage 708, located externally to the peer computer 104a, or the like.

As described above with regard to FIG. 1, in various embodiments, the peer computer 104a may be embodied by a dedicated server computer, a desktop computer, a laptop computer, a handheld computing device, a mobile telephone, a video game system, a mobile entertainment device, a set-top box, and/or other computing devices capable of providing and/or accessing a service. In a further embodiment, the peer computer 104a is embodied by a user workstation. One of skill in the art will recognize other embodiments of the peer computer 104a and other arrangements for the service recovery module 106 in view of this disclosure.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving, at a first computer, periodic status messages from a peer computer, each periodic status message indicating that the peer computer is providing a service;
   determining, based on the periodic status messages, that the peer computer has stopped providing the service; and
   providing the service, at the first computer, in response to determining that the peer computer has stopped providing the service, the first computer selected to provide the service using a balancing procedure configured to reduce a chance of a tie between the first computer and one or more additional peer computers in the selection, wherein the selection and balancing procedure is performed by a temporary master computer selected from a plurality of computers consisting of the first computer and one or more additional peer computers.

2. The method of claim 1, further comprising performing the balancing procedure, the balancing procedure comprising: comparing a factor corresponding to the first computer and to the one or more additional peer computers.

3. The method of claim 2, further comprising stopping the first computer from providing the service in response to a subsequent balancing procedure, wherein one of the additional peer computers provides the service in response to the subsequent balancing procedure.

4. The method of claim 1, wherein the temporary master computer ceases to serve as the temporary master computer in response to selecting the first computer to provide the service.

5. The method of claim 2, wherein the factor is selected from the group consisting essentially of a history of a computer providing the service, a total number of services that a computer currently provides, and a total number of services for which a computer serves as a backup service provider.

6. The method of claim 2, wherein the balancing procedure further comprises comparing a plurality of factors, the plurality of factors comprising a random seed factor for each computer such that the balancing procedure is configured to reduce the chance of a tie between the first computer and the one or more additional peer computers in the selection.

7. The method of claim 2, further comprising: initiating the balancing procedure in response to the first computer providing at least two more services than a computer from the additional peer computers provides.

8. The method of claim 2, further comprising: repeating the balancing procedure for one or more additional services and further repeating the balancing procedure for a plurality of backup services in response to a stable balance of the service and the one or more additional services.

9. The method of claim 2, further comprising: repeating the balancing procedure in response to a computer providing a service and concurrently serving as a backup service provider for the service.

10. The method of claim 1, further comprising sending outgoing periodic status messages from the first computer to an additional peer computer, each outgoing periodic status message indicating that the first computer is providing the service.

11. The method of claim 1, further comprising serving, at the first computer, as a backup service provider for a second service in response to a determination that an additional peer computer has stopped serving as the backup service provider for the second service.

12. The method of claim 1, wherein determining that the peer computer has stopped providing the service comprises determining that the peer computer fails to send a periodic status message.

13. The method of claim 1, wherein determining that the peer computer has stopped providing the service comprises determining that a received periodic status message from the peer computer indicates that the peer computer has stopped providing the service.

14. The method of claim 1, wherein one or more of the periodic status messages further indicates that the peer computer serves as a backup service provider for one or more additional services.

15. An apparatus comprising:
a status monitor module configured to receive, at a first computer, periodic status messages from a peer computer, each periodic status message indicating that the peer computer is providing a service;
a failure detection module configured to determine, based on the periodic status messages, that the peer computer has stopped providing the service; and
an advancement module configured to provide the service, at the first computer, in response to determining that the peer computer has stopped providing the service, the first computer selected to provide the service using a balancing procedure configured to reduce a chance of a tie between the first computer and one or more additional peer computers in the selection,
wherein the selection and balancing procedure is performed by a temporary master computer selected from a plurality of computers consisting of the first computer and one or more additional peer computers.

16. The apparatus of claim 15, further comprising a balancing procedure module configured to perform the balancing procedure, the balancing procedure comprising: comparing a factor corresponding to the first computer and to the one or more additional peer computers.

17. The apparatus of claim 15, further comprises a status broadcast module configured to send outgoing periodic status messages from the first computer to an additional peer computer, each outgoing periodic status message indicating that the first computer is providing the service.

18. The apparatus of claim 17, wherein the additional peer computer begins serving as a backup service provider for the service in response to the first computer providing the service.

19. The apparatus of claim 15, wherein the first computer and the peer computer comprise user workstations in communication over a data network, the user workstations forming a distributed server environment to provide one or more services over the data network, the services selected from the group consisting of a domain name system ("DNS") service, a dynamic host configuration protocol ("DHCP") service, and a lightweight directory access protocol ("LDAP") service.

20. A non-transitory machine-readable storage medium storing computer executable program code, the computer executable program code executable to perform operations, the operations comprising:
receiving, at a first computer, periodic status messages from a peer computer, each periodic status message indicating that the peer computer is providing a service;
determining, based on the periodic status messages, that the peer computer has stopped providing the service; and
providing the service, at the first computer, in response to determining that the peer computer has stopped providing the service, the first computer selected to provide the service using a balancing procedure configured to reduce a chance of a tie between the first computer and one or more additional peer computers in the selection,
wherein the selection and balancing procedure is performed by a temporary master computer selected from a plurality of computers consisting of the first computer and one or more additional peer computers.

21. The computer readable storage medium of claim 20, further comprising performing the balancing procedure, the balancing procedure comprising: comparing a factor corresponding to the first computer and to one or more additional peer computers.

22. The computer readable storage medium of claim 20, further comprising sending outgoing periodic status messages from the first computer to an additional peer computer, each outgoing periodic status message indicating that the first computer is providing the service.

* * * * *